June 9, 1959  R. LEUENBERGER  2,889,948
METHOD OF TRANSPORTING AN IRRIGATION PIPELINE ALONG A FIELD
Filed April 2, 1956
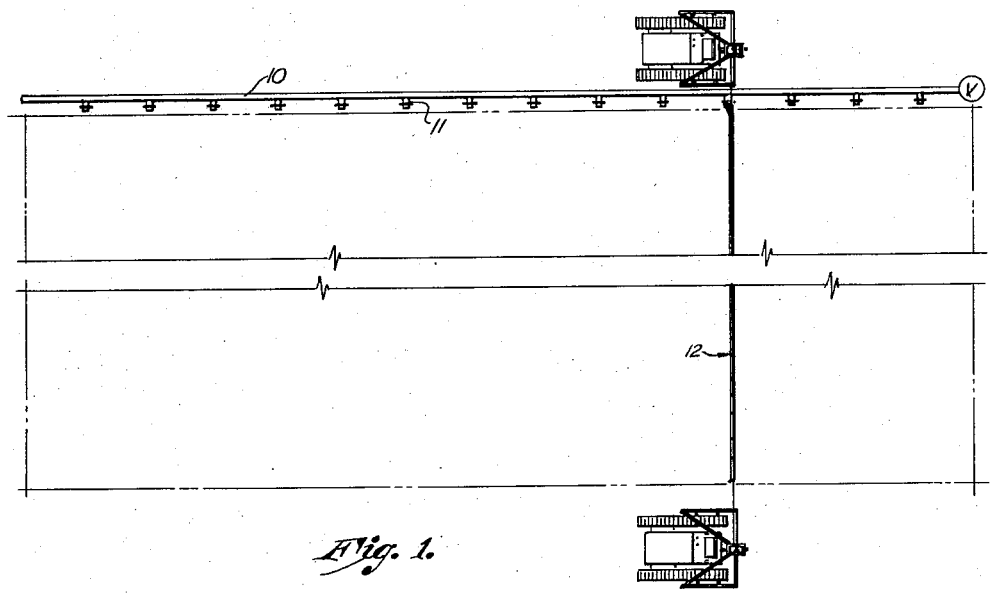
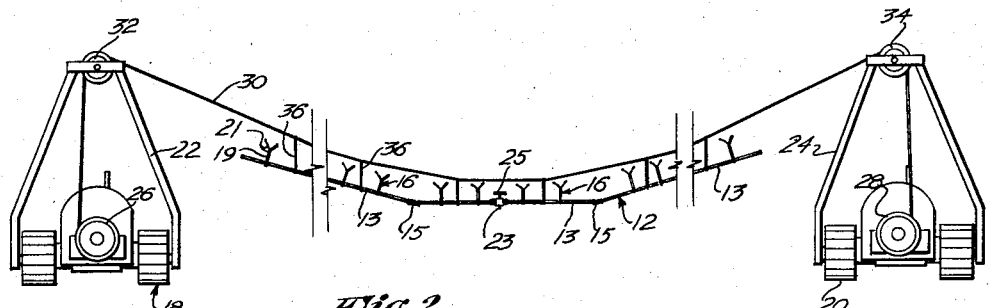
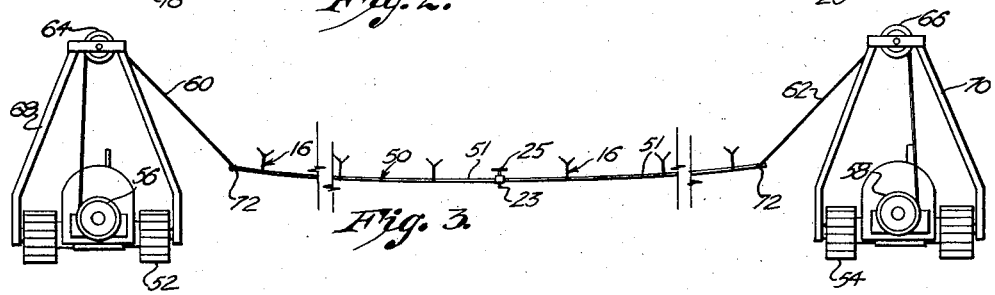
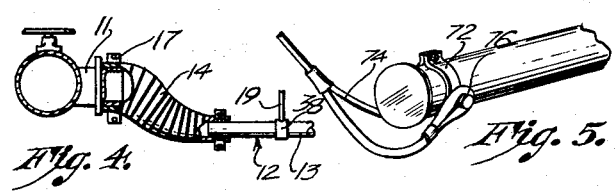 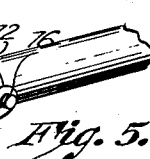
INVENTOR.
Rudolf Leuenberger
BY
ATTORNEY United States Patent Office 2,889,948
Patented June 9, 1959

2,889,948

METHOD OF TRANSPORTING AN IRRIGATION PIPELINE ALONG A FIELD

Rudolf Leuenberger, Weona, Ark.

Application April 2, 1956, Serial No. 575,462

1 Claim. (Cl. 214—152)

This invention relates to the field of irrigation and has for its primary object the provision of a novel method of irrigating fields, and pertains particularly to the steps in the method of transporting an irrigation pipeline from one location to a new location where the pipeline may again be connected with a source of water and a predetermined area of the field irrigated thereby.

In the field of irrigation wherein sprinkler systems are utilized, relatively long pipelines or conduits, which usually consist of a plurality of elongated pipe sections interconnected in end-to-end relationship by means of relatively flexible couplings, are normally laid in position and a portion of the field is irrigated by virtue of the provision of a plurality of sprinklers spaced at intervals along the pipeline. Manifestly, such pipelines must be moved from time-to-time and one of the most harrassing problems relates to the transporting operation.

While many methods have heretofore been suggested to meet the problem it is contemplated by the present invention that the pipeline be lifted off the ground and, while being held in a suspended condition, transferred from one point to another and thereupon lowered for connection with a primary supply line for the irrigation water.

It is the most important object of the instant invention to provide an efficient method of the aforementioned character that includes the steps of first lifting the pipeline off the ground, thereupon transferring the same to a new location while so suspended, and thereupon lowering the pipeline to the ground for subsequent connection with a source of irrigation water.

Another important object of the instant invention is to provide a method of irrigating fields that includes transferring an irrigation pipeline across the field transversely to the longitudinal axis of the pipeline through the medium of a pair of opposed mobile vehicles traveling simultaneously and in the same direction with the pipeline supported thereby in a suspended condition therebetween.

A further object of the instant invention is the provision of an improved method of irrigation which includes the said step of first lifting the pipeline off the ground before transporting the same, such method being advantageously accomplished within the concepts of the invention by exerting a pull upon flexible cable means to which the pipeline is connected, and preferably through utilization of hoist mechanism which is of itself mobile so that the pipeline can be moved to a new location after the same has been elevated to a predetermined height.

In the drawing:

Fig. 1 is a plan view illustrating the manner of carrying out the irrigation method of the instant invention and showing structure for supporting and transporting an irrigation pipeline;

Fig. 2 is an end elevational view of the equipment shown in Fig. 1, illustrating the pipeline suspended, ready for movement to a new location;

Fig. 3 is a view similar to Fig. 2 illustrating a modified form of apparatus for carrying out the method;

Fig. 4 is a fragmentary, detailed view illustrating the manner of connecting the irrigation pipeline to a primary supply line; and Fig. 5 is a fragmentary, perspective view showing the way of connecting the pipeline to the hoist and transporting vehicle shown in Fig. 3.

In the irrigation process to which the instant invention relates a primary supply line 10 coupled with a source of irrigation water (not shown) is provided with a series of lateral discharge couplings 11 adapted to selectively receive one or more movable irrigation pipelines or manifolds generally designated 12 normally extending at right angles to the supply line 10 as best seen in Fig. 1. Each pipeline 12 is relatively flexible and, in normal practice, may consist of several elongated pipe sections 13 coupled in end-to-end relationship with preferably flexible couplings 15. The connection of pipeline 12 with any discharge couplings 11 may be made in any suitable manner and, by way of suggestion, there is shown a short flexible conduit 14 having easily and quickly detachable clamp means or the like 17 for interconnecting the pipeline 12 and a selected coupling 11.

When it becomes desirable or necessary to move the pipeline 12 to a new location for the purpose of irrigating a new area through use of a series of sprinklers 16 on the sections 13 and accordingly spaced along the line 12, the pipeline 12 is first disconnected from the supply line 10 and thereupon elevated to a position raised from the ground as shown in Fig. 2 of the drawing. The sprinklers 16 each include an upright pipe 19, which may be tapped into a section 13 of pipeline 12, as by couplings 38, and a sprayer or nozzle 21. Alternately, and perhaps even more conventional at the present time, the pipes 19 of sprinklers 16 may be mounted on the pipeline 12 by including and securing the same only on the flexible couplings 15 between the pipe sections 13.

The equipment employed for transporting the pipeline 12 includes a pair of spaced apart mobile vehicles 18 and 20, such as crawler type tractors, each of which is provided with an upright standard 22 and 24 respectively forming a part of hoisting mechanism that includes winches or the like 26 and 28 respectively, operably coupled with the power take-off means of the vehicles 18 and 20 in any suitable manner, not shown.

The hoisting mechanism additionally includes a flexible cable 30 that is common to the winches 26 and 28 and trained over elevated pulleys 32 and 34 respectively, which are rotatably mounted at the uppermost ends of the standards 22 and 24.

The sections 13 of pipeline 12 may be connected with the cable 30 in various ways. For instance, the cable 30 could be secured directly to each of the upstanding sprinkler pipes 19 by any suitable clamping means (not shown). However, the currently preferred method, in order to minimize strains on the various parts of the pipeline 12 and its sprinklers 16, is to provide the pipeline 12 with a number of spaced, flexible, riser cables 36 secured at their uppermost extremities in any suitable manner to the cable 30 at spaced intervals therealong, as illustrated in Fig. 2, the lower extremities of the riser cables 36 are secured to the sections 13 in any suitable manner, such as by removable clamping means similar to that illustrated in Fig. 5 and hereinafter more fully described. With sections 13 consisting of conventional 40 foot lengths of 3 inch pipe each weighing around 25 pounds, a single riser 36 has been found sufficient for each section 13. When only a single riser 36 is used for each section 13, however, it is desirable that the riser 36 be secured to the section 13 adjacent the middle or point of balance of the latter, in order to avoid any objectionable strains on the flexible couplings 15.

It will be observed that the risers 36 illustrated in Fig. 2 are of substantially equal length. This has been found advantageous, in that, as the cable 30 is tightened and assumes its natural, generally catenary-like disposition, the relatively flexible, sectioned pipeline 12 assumes a generally corresponding attitude as it is lifted from the ground. Thus, water remaining within the pipeline 12 when lifting thereof is comenced will tend to run toward the center thereof for discharge through the sprinklers 16 of the central sections 13, or preferably, for discharge through a center drain 23 provided with a control valve 25 coupled between the central pair of sections 13 (or in a center section 13). The discharge of such stored water during lifting obviously decreases materially the weight of the pipeline 12 to be lifted and, consequently, the strains upon and strengths required in the cable 30, risers 36 and associated equipment. If it were desired to use an unsectioned or relatively inflexible pipeline 12, it will be apparent that the lengths of the risers 36 should be unequal and proportioned to maintain the pipeline 12 relatively straight during variation of catenary curve of cable 30 as the latter is tightened to raise the pipeline 12 sufficiently to clear the ground for transverse movement.

It is now clear that when the pipeline 12 is attached to the vehicles 18 and 20 in the manner just above described, the same may be easily and quickly raised off the ground by exerting a pull on the cable 30 through operation of either winch 26 or winch 28, but it is to be preferred that the two hoisting mechanisms be placed in operation simultaneously so that the pipeline 12 is lifted vertically without tendency to move along its longitudinal axis toward and away from either of the vehicles 18 and 20.

As soon as the pipeline 12 is thus lifted sufficiently high to clear obstructions along the intended path of travel thereof, the two vehicles 18 and 20 are advanced simultaneously and preferably along parallel paths of travel, particularly if the main supply line 10 to which the pipeline 12 is to be subsequently connected lies in a straight line as seen in Fig. 1. Furthermore, if it is contemplated that the pipeline 12 in the new location will lie normal to the pipeline 10 it is to be preferred that the two vehicles 18 and 20 proceed at substantially the same rate of speed. As soon as the pipeline 12 is relocated it is but necessary to again actuate the hoists so as to lower the pipeline 12 to the ground, whereupon pipeline 12 may be reconnected with the pipeline 10 through use of the flexible conduit 14, seen best in Fig. 4 of the drawing.

The equipment just above described is preferred in all instances wherein the irrigation pipeline 12 is of such nature that adequate support must be maintained to prevent bending or damage thereto. However, certain principles of the method of the instant invention may also be carried out in the manner illustrated by Figs. 3 and 5 of the drawing in substantially the same manner whenever the system contemplates the utilization of an irrigation pipeline 50 of either unitary nature or having coupled sections 51 that are of sufficient structural strength to permit coupling of the pipeline 50 within and as the central part of the cable of the dual hoisting assemblies.

In this connection it is seen that there is provided a pair of mobile vehicles 52 and 54 each having hoisting mechanism that includes winches 56 and 58, cables 60 and 62, trained over pulleys 64 and 66 respectively and mounted on upright standards 68 and 70, forming a part of the hoisting mechanisms and carried by the corresponding vehicles 52 and 54.

When the method is carried out through use of the equipment shown in Figs. 3 and 5, it is unnecessary to provide the cable 30 or risers 36; instead, the ends of the cables 60 and 62 are connected directly to corresponding ends of the pipeline 50 through the medium of clamps 72. It is desirable in this instance to provide yokes 74 at the ends of the cables 60 and 62 which embrace the pipeline 50 and pivotally connect with the corresponding clamps 72 through use of opposed pintles 76 on the latter.

Here, again, it is contemplated that the pipeline 50, after being disconnected from the main supply line 10, be first elevated to a predetermined height by actuation of the winches 56 and 58 to exert a pull on cables 60 and 62. It may be expected that the pipeline 50, as same is lifted, will tend toward the assumption of a generally catenary-like disposition, depending upon the degree of its flexibility. As soon as pipeline 50 has been lifted clear of the ground, the vehicles 52 and 54 are advanced to transport the elevated pipeline 50 to a new location, whereupon pipeline 50 is lowered to the ground and reconnected with the main supply line 10.

In each instance the method contemplates disposition of the pipeline 12 or 50, as the case may be, between the transporting vehicles, with the longitudinal axis of the movable pipeline disposed perpendicularly to the contemplated path of travel thereof. By such construction the moving vehicles may be disposed on dry ground spaced from the ends of the pipeline, and it is unnecessary to work in muddy areas or risk damaging the crop by virtue of the transporting operation. In each instance also, the hoisting mechanism is of itself movable and, accordingly, an important step in the method contemplates the raising and lowering of mechanism to thereby raise and permit advancement of both the pipeline and the supporting means therefor from place-to-place along the field to be irrigated.

Having thus described the invention, what is claimed as new and desired to be secured by Letters Patent is:

A method of transporting an elongated pipe in a direction lateral thereto comprising the steps of disposing a flexible element of greater length than the pipe along the latter; securing the element to the pipe at a plurality of spaced points along the latter; elevating portions of the element disposed beyond each end of the pipe above the latter; exerting opposite pulling forces on said portions of the element to tighten the latter and raise the pipe into suspended condition from the element and above the ground; moving both of said portions simultaneously substantially equal distances in substantially parallel paths lateral to the pipe while maintaining said portions elevated and continuing to exert said opposite pulling forces thereon; and releasing said pulling forces to lower the pipe onto the ground.

References Cited in the file of this patent

UNITED STATES PATENTS

| | | |
|---|---|---|
| 426,169 | Chapman | Apr. 22, 1890 |
| 2,024,374 | Longebrake | Dec. 17, 1935 |
| 2,731,295 | Snow | Jan. 17, 1956 |
| 2,789,009 | Maraccini | Apr. 16, 1957 |

FOREIGN PATENTS

| | | |
|---|---|---|
| 812,123 | Germany | July 8, 1949 |